United States Patent
Shingai et al.

(10) Patent No.: US 8,191,063 B2
(45) Date of Patent: May 29, 2012

(54) METHOD FOR MIGRATING A PLURALITY OF VIRTUAL MACHINES BY ASSOCIATING FILES AND STATE INFORMATION WITH A SINGLE LOGICAL CONTAINER

(75) Inventors: Randall Shingai, San Jose, CA (US); Suhas Urkude, Sunnyvale, CA (US)

(73) Assignee: Symantex Corporation, Mountain View, CA (US)

( * ) Notice: Subject to any disclaimer, the term of this patent is extended or adjusted under 35 U.S.C. 154(b) by 1276 days.

(21) Appl. No.: 11/865,063

(22) Filed: Sep. 30, 2007

(65) Prior Publication Data

US 2009/0089781 A1    Apr. 2, 2009

(51) Int. Cl.
G06F 9/455    (2006.01)
(52) U.S. Cl. .......................................................... 718/1
(58) Field of Classification Search ........................ 718/1
See application file for complete search history.

(56) References Cited

U.S. PATENT DOCUMENTS

| | | | |
|---|---|---|---|
| 7,257,811 B2 | 8/2007 | Hunt et al. | |
| 7,313,793 B2 | 12/2007 | Traunt et al. | |
| 7,383,405 B2 * | 6/2008 | Vega et al. | 711/162 |
| 2005/0060590 A1 * | 3/2005 | Bradley et al. | 713/320 |
| 2005/0251802 A1 | 11/2005 | Bozek et al. | |
| 2006/0005189 A1 | 1/2006 | Vega et al. | |
| 2006/0195715 A1 | 8/2006 | Herington | |
| 2007/0220121 A1 * | 9/2007 | Suwarna | 709/220 |

OTHER PUBLICATIONS

Huang, Nomad: Mirating OS-bypass Networks in Virtual Machines, Ohio State University, Jun. 2007.
Song Fu, Service Migration in Distributed Virtual Machines for Adaptive Grid Computing, Wayne State Uniiversity, 2005.
Laszewski, Grid-based Asynchronous Migration of Execution Context in Java Virtual Machines, Waseda University.
Zhu, JESSICA2: A Distributed Java Virtual Machine with Transparent Thread Migration Support, University of Hong Kong, 2002.

* cited by examiner

*Primary Examiner* — Meng An
*Assistant Examiner* — Wissam Rashid
(74) *Attorney, Agent, or Firm* — Advantedge Law Group

(57) ABSTRACT

A logical container may be created to facilitate the quick and efficient migration of one or more virtual machines from a source server to a destination server. The logical container may contain all of the files and state information related to the one or more virtual machines. The one or more virtual machines may be migrated by dismounting the logical container from a source server and mounting the logical container to a destination server. A management service may be include to facilitate batch migration of multiple virtual machines from a source server to a destination server.

13 Claims, 8 Drawing Sheets

METHOD FOR MIGRATING A PLURALITY OF VIRTUAL MACHINES BY ASSOCIATING FILES AND STATE INFORMATION WITH A SINGLE LOGICAL CONTAINER

BACKGROUND

Conventionally, a single computer system operated a single operating system. For example, each computer user may be assigned a client computing device that runs an operating system and various application programs as desired. A server computing device may also run in a similar fashion with a single operating system and various applications.

In an effort to expand the number of operating systems and application programs that can run on a computer system, a virtualization technology has developed where a given computer having one type of CPU, called a host, includes an emulator program that allows the host computer to emulate the instructions of an unrelated type of CPU, called a guest. Thus, the host computer executes an application that causes one or more host instructions to be called in response to a given guest instruction. Thus, the host computer can both run software designed for its own hardware architecture and software written for computers having an unrelated hardware architecture. For example, a computer system manufactured by Apple Computer may run operating systems and programs written for PC-based computer systems. It may also be possible to use an emulator program to operate multiple incompatible operating systems concurrently on a single CPU. In this arrangement, although each operating system is incompatible with the other, an emulator program can host one of the two operating systems, allowing the otherwise incompatible operating systems to run concurrently on the same computer system.

When a guest computer system is emulated on a host computer system, the guest computer system is commonly said to be a "virtual machine" since the guest computer system only exists in the host computer system as a pure software representation of the operation of one specific hardware architecture. The terms emulator, virtual machine, and processor emulation are sometimes used interchangeably to denote the ability to mimic or emulate the hardware architecture of an entire computer system. For example, some commercially available software emulates an entire computer that includes an Intel 80X86 Pentium processor and various motherboard components and cards. The operation of these components is emulated in the virtual machine that is being run on the host machine. An emulator program executing on the operating system software and hardware architecture of the host computer, such as a computer system having a PowerPC processor, mimics the operation of the entire guest computer system.

The emulator program acts as the interchange between the hardware architecture of the host machine and the instructions transmitted by the software running within the emulated environment. This emulator program may be a host operating system (HOS), which is an operating system running directly on the physical computer hardware. Alternately, the emulated environment might also be a hypervisor or virtual machine monitor which is a software layer that runs directly above the hardware and which virtualizes all the resources of the machine by exposing interfaces that are the same as the hardware the hypervisor is virtualizing (which enables the hypervisor to go unnoticed by operating system layers running above it). A host operating system and a hypervisor may run side-by-side on the same physical hardware.

One of the many advantages of a virtual machine over a physical machine is the ability to quickly and cheaply create multiple instances of the same virtual machine. Multiple virtual machines can exist simultaneously in a single host machine (host computer system) environment, and resources of the host machine can be divided amongst the various virtual machines. This flexible resource allocation becomes even more useful when combined with the ability to move, or "migrate," virtual machines from one host machine to another.

Being able to migrate a virtual machine quickly and easily from one host machine to another is useful, for example, for "load balancing" systems, decommissioning machines, performing hardware or software upgrades, or handling disaster recovery. More specifically, if a virtual machine requires more processing power than is available on one host machine, it can be moved to another host machine that has extra capacity. If the host machine requires hardware maintenance or a software upgrade, the virtual machine may be migrated from one physical machine to another temporarily, which thereby allows the first physical machine to be taken down and upgraded. In the case of disaster recovery, if, for example, an impending flood or storm is predicted, all virtual machines of a datacenter can be migrated to another datacenter that is out of harm's way and then migrated back when the threat passes. In all cases, this allows, for example, critical business applications to remain up and running without interruption and without the user even being aware of the interruption.

Performing a virtual machine migration process involves moving all the states of the virtual machine. These states include three areas: (1) the virtual machine virtualized device state, which is the internal states of all virtualized controllers and motherboard virtualized devices, such as the virtualized interrupt controller, virtualized SCSI controller, and virtualized video controller; (2) the virtual machine memory state; and (3) the virtual machine disk state, which is the persistent storage.

In server virtualization technologies, the virtual machine's state information and data does not reside in the same storage object. This can present a number of problems, especially when a large number of virtual machines need to be migrated. For example, the administrator has to worry about migrating each and every virtual machine and making sure that the storage it has been accessing is also accessible at the destination host machine. Also, migrating large numbers of virtual machines takes a long time and is an error prone process due the multiple steps that are required for each virtual machine.

It would be desirable to provide a way to migrate one or more virtual machines, preferably, large numbers of virtual machines quickly and efficiently.

SUMMARY

Various embodiments are shown herein of systems and methods for migrating one or more virtual machines. A logical container may be provided that includes all of the files related to the virtual machine as well as state information pertaining to the virtual machine. The logical container may be used to migrate the virtual machine quickly and efficiently by eliminating the need to copy all of the files from one host to another host. Also, a management service may be provided that is used to migrate multiple virtual machines. The management service may allow the administrator to shut down and start up all of the virtual machines as part of the migration process. The use of the logical container and/or the management service makes it significantly easier to migrate large numbers of virtual machines by eliminating the many steps that normally would have to be performed. Any number of virtual machines can be migrated in a constant or near constant amount of time.

In one embodiment, a method of creating a logical container includes associating all of the files related to a plurality of virtual machines with the logical container and associating state information for the plurality of virtual machines with the logical container. The logical container may contain all of the information necessary to migrate the plurality of virtual machines from a source server to a destination server by dismounting the logical container from the source server and mounting it to the destination server and without copying all of the files relating to the plurality of virtual machines from the source server to the destination server. The state information may include at least one of: a state of processor registers, a state of virtual hardware, or a state of virtual memory. Also, the management service may be used to associate all of the files and state information with the logical container. The plurality of virtual machines may includes at least three, four, five, six, or more virtual machines. The files related to the plurality of virtual machines may be stored on a plurality of storage devices. Associating all of the files related to the plurality of virtual machines and/or associating state information for the plurality of virtual machines with the logical container may be accomplished in a single operation using a management service.

In another embodiment, a method of migrating a plurality of virtual machines dismounting a logical container from a source server and mounting the logical container to a destination server. The logical container includes all of the files related to a plurality of virtual machines on the source server. In one embodiment, the plurality of virtual machines may be shut down before the logical container is dismounted from the source server. The management service may be used to shut down the plurality of virtual machines in a single operation. The management service may also be used to start up the plurality of virtual machines in a single operation after mounting the logical container to the destination server. In another embodiment, the plurality of virtual machines may be migrated while the virtual machines are running. Dismounting the logical container from the source server includes relinquishing exclusive access to the logical container by the source server and mounting the storage container to the destination server includes acquiring exclusive access to the logical container. The logical container includes files stored on a plurality of storage devices.

In another embodiment, a method of migrating a virtual machine includes: pausing a virtual machine that is operating on a source server so that the virtual machine is in a stable state, storing state information for the virtual machine to a logical container, dismounting the logical container from the source server, mounting the storage container to a destination server, retrieving the state information from the logical container, and resuming operation of the virtual machine on the destination server. The method may include migrating a plurality of virtual machines using the same method. The management service may be used to pause the plurality of virtual machines, store state information for the plurality of virtual machines, and/or resume operation of the plurality of virtual machines in a single operation. The state information may include at least one of: a state of processor registers, a state of virtual hardware, or a state of virtual memory.

DRAWINGS

DETAILED DESCRIPTION

A number of embodiments of systems and methods that can be used to migrate one or more virtual machines from one host to another are described herein. The systems and methods are especially suited for migrating large numbers of virtual machines from one server to another server. This may be desirable in large network computing systems that have multiple servers and storage devices networked together. In one embodiment, the systems and methods described herein may be used to migrate as many as a hundred or more virtual machines. In the past, such a process was very time consuming and tedious since each virtual machine had to be migrated separately.

A computer system can be thought of conceptually as having one or more layers of software running on a foundation layer of hardware. This layering is done for reasons of abstraction. By defining the interface for a given layer of software, that layer can be implemented differently by other layers above it. In a well-designed computer system, each layer only knows about (and only relies upon) the immediate layer beneath it. This allows a layer or a "stack" (multiple adjoining layers) to be replaced without negatively impacting the layers above said layer or stack. For example, software applications (upper layers) typically rely on lower levels of the operating system (lower layers) to write files to some form of permanent storage, and these applications do not need to understand the difference between writing data to a floppy disk, a hard drive, or a network folder. If this lower layer is replaced with new operating system components for writing files, the operation of the upper layer software applications remains unaffected.

The flexibility of layered software allows a virtual machine to present a virtual hardware layer that is really another software layer. In this way, a virtual machine can create the illusion that the higher layers of software are running on a separate computer system. Thus, virtual machines can allow multiple "guest systems" to run concurrently on a single "host system."

Figure 1:
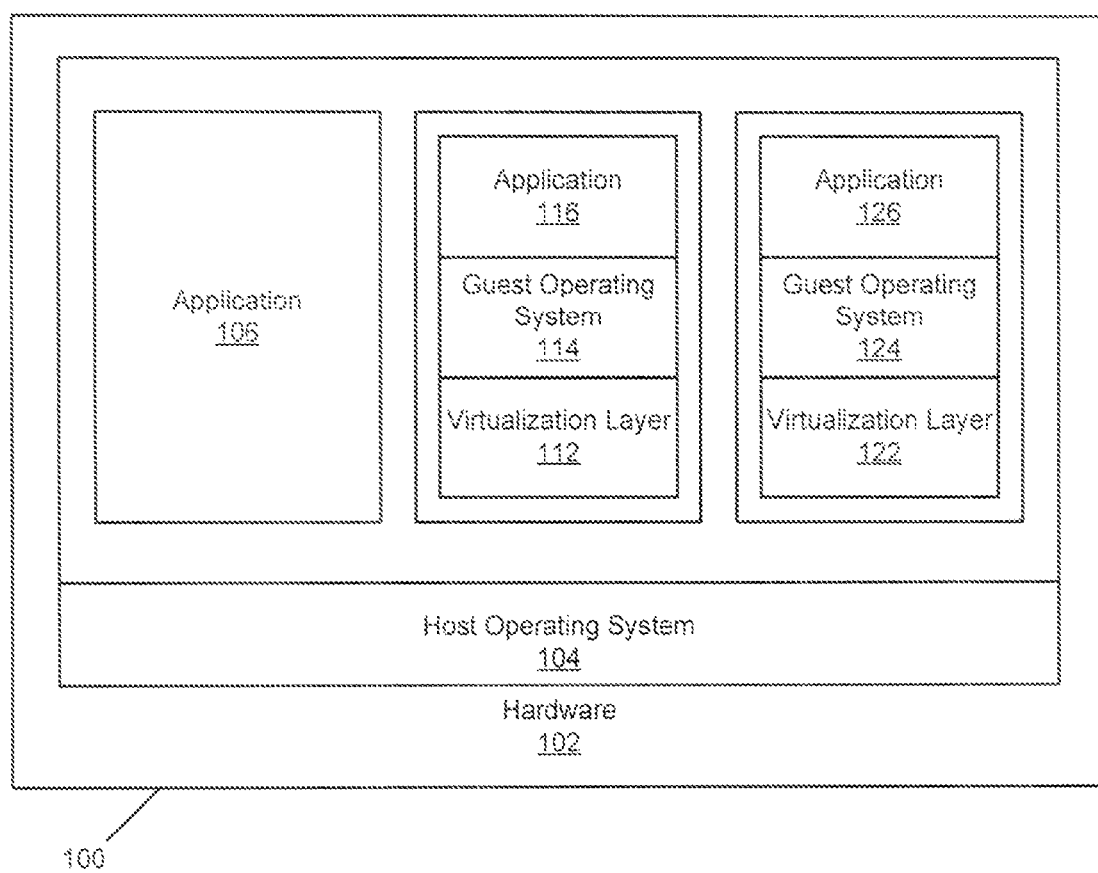
FIG. 1 is a diagram of a computer system that has a plurality of virtual machines where the host operating system functions as the emulator program.

It should be appreciated that virtualization can be applied to a range of system layers including operating system level virtualization (FIG. 1), hardware level virtualization (FIG. 2), or higher level virtualization. FIG. 1 shows a diagram of one implementation of a computing system or server 100 virtualized at the operating system level. The virtualized computing system 100 includes a host operating system software layer 104 running directly above physical computer hardware 102. Two virtualization layers are above the host operating system 104. Each virtualization layer includes a virtual machine 112, 122. As shown in FIG. 1, applications such as application 106 can run above the host operating system in parallel with the virtual machines 112, 122. Also, each virtual machine 112, 122 runs a guest operating system 114, 124 and one or more applications 116, 126. It should be appreciated that the computing system 100 may be varied in any of a number of suitable ways. For example, the computing system 100 may include many, many more virtual machines than are shown in FIG. 1.

Figure 2:
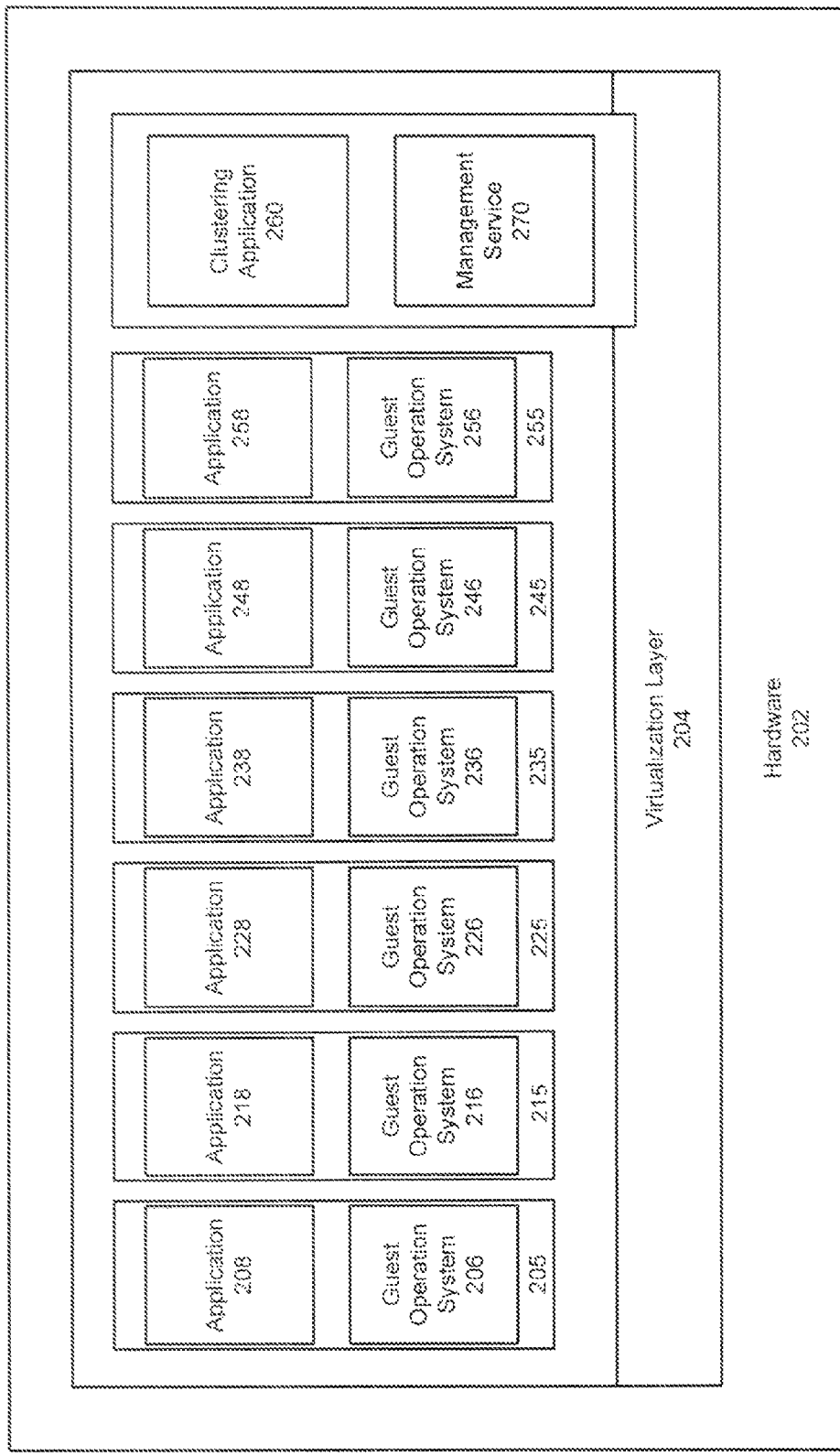
FIG. 2 is a diagram of another computing system that has a plurality of virtual machines where a hypervisor functions as the emulator program.

FIG. 2 shows an implementation of a computing system or server 200 virtualized at the hardware-level. The virtualized computing system 200 includes a virtualization layer above the physical computer hardware 202. The virtualization layer includes a hypervisor 204. This type of approach is often called a "bare-metal" approach since the hypervisor 204 has direct access to the hardware. For this reason, the hypervisor 204 may provide certain advantages over operating system level virtualization such as greater scalability, robustness, and performance.

In the embodiment shown in FIG. 2, the computing system 200 includes a plurality of virtual machines 205, 215, 225, 235, 245, 255. Guest operating systems 206, 216, 226, 236, 246, 256 operate above the virtual machines 205, 215, 225, 235, 245, 255. The guest operating systems 206, 216, 226, 236, 246, 256 execute applications 208, 218, 228, 238, 248, 258. A management service 270 operates above the hypervisor 204 and includes a clustering application 260. In one embodiment, the computing system 200 is one of a number of servers that are networked together as part of a larger network such as a local-area network. It should be appreciated that in such a system, the management service 270 may reside on any of the servers on the network and use various agents or other control techniques to manage the operation of the overall network of servers as well as the virtual machines that reside thereon. It should also be appreciated that the physical hardware 202 may include external devices networked to the processor of the computing system 200. For example, the hardware 202 may include a storage-area network (SAN) or network attached storage (NAS).

With regard to FIGS. 1 and 2, it is important to note that the virtual machines shown thereon are virtualized computer hardware representations that exist only as software constructions and which are made possible due to the presence of specialized software code that not only presents the virtual machines to the respective guest operating system, but which also performs all of the software steps necessary for the guest operating systems to interact with the real physical computer hardware 102, 202.

This complete functionality can be referred to as a virtual machine monitor where, for certain embodiments (such as the one illustrated in FIG. 1), the virtual machine monitor comprises part of the host operating system 104. However, in other embodiments the virtual machine monitor may be an application running above the host operating system 104 and interacting with the computer hardware 102 only through the host operating system 104. In yet other embodiments, the virtual machine monitor may comprise a partially independent software system that on some levels interacts indirectly with the computer hardware 102 via the host operating system 104 but on other levels the virtual machine monitor interacts directly with the computer hardware 102 (similar to the way the host operating system interacts directly with the computer hardware). And in yet other embodiments (such as the one illustrated in FIG. 2), the virtual machine monitor may comprise a fully independent software system such as the hypervisor 204 that on all levels interacts directly with the computer hardware 202 (similar to the way the host operating system interacts directly with the computer hardware in FIG. 1) without utilizing a host operating system. All of these variations for implementing the virtual machine monitor can be considered to form alternative embodiments of the computing systems as described herein.

Figure 3:
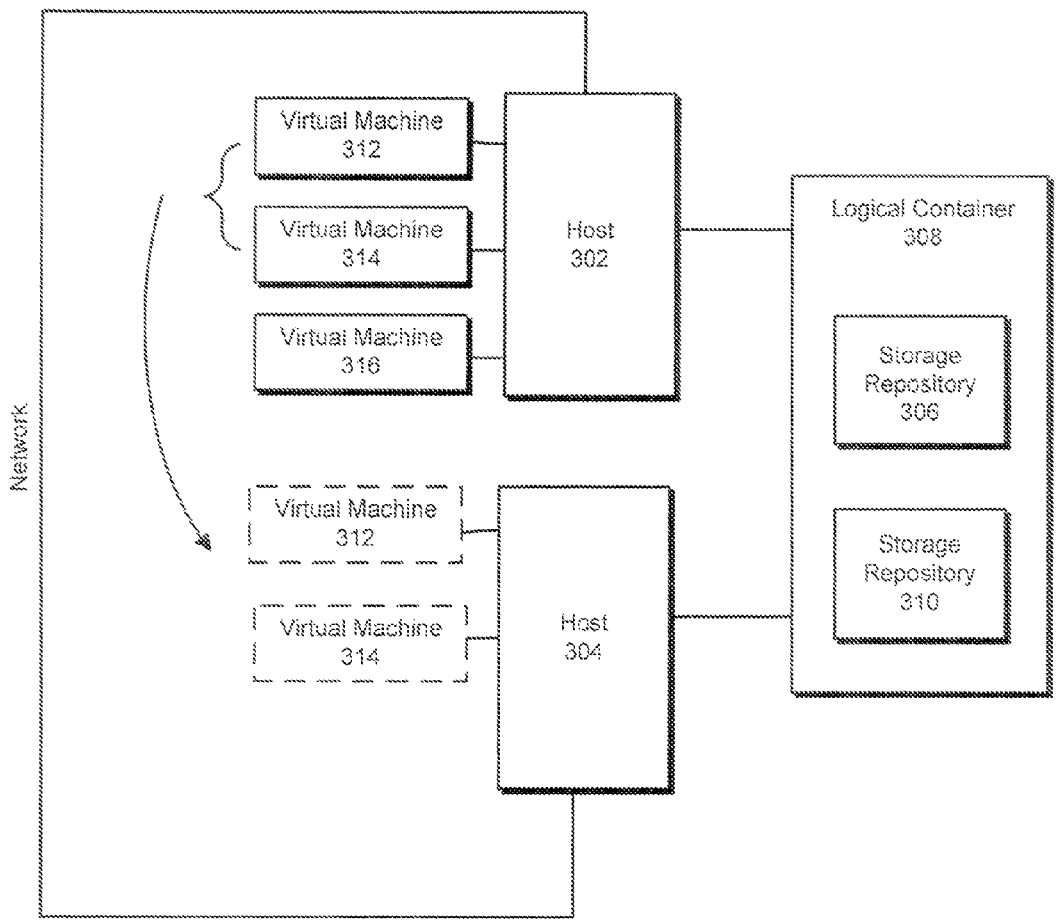
FIG. 3 is a diagram of a system that includes a plurality of virtual machines that are to be migrated from a source host to a destination host.

Turning now to FIG. 3, a system for migrating one or more virtual machines is shown. The system includes a source server 302, a destination server 304, and a logical container 308. It should be appreciated that the term server is used in a broad and general sense and corresponds to a single computing device. The servers 302, 304 may each include hardware, such as memory, processors, and so on. The logical container 308 encompasses storage repositories 306, 310. The storage repositories 306, 310 represent the physical storage of the system. Each storage repository 306, 310 may include any suitable storage device (e.g., hard drives, flash memory drive, drive array, or peer-to-peer storage system, among others). In one embodiment, each storage repository 306, 310 may include a storage area network (SAN). The SAN may be considered a network of storage devices such as hard drives. In large enterprises, SANs connect the servers 302, 304 as well as potentially numerous other servers to a centralized pool of disk storage. SANs improve system administration by making it easier to manage hundreds of servers, each of which has its own hard drive. It should be appreciated that any number and configuration of storage devices may be encompassed within the logical container 308. As shown in FIG. 3, the servers 302, 304 and the logical container 308 may be connected to each other via a network, e.g., SAN connectivity for the logical container 308.

Each of the servers 302, 304 may be configured to host one or more virtual machines. In a large enterprise networked environment, the servers 302, 304 may be configured to host a relatively large number of virtual machines. The number of virtual machines shown on the servers 302, 304 in FIG. 3 have been chosen for illustration purposes only and should not be considered to be limiting in any way. In FIG. 3, the virtual machines 312, 314 are shown as being migrated from the source server 302 to the destination server 304. The virtual machine 316 is left on the source server 302. This example of migrating virtual machines may reflect a situation that may occur when it is desired to load balance the servers 302, 304.

The virtual machines 312, 314 each have a related set of files and state information that is analogous to the files and state information of a physical computing machine. The files include configuration files, virtual disk files, virtual storage files, and other types of information that is needed for the virtual machines 312, 314 to run on the servers 302, 304. In one embodiment, the related files may be stored in the logical container 308 as a single data file. The physical files may be stored on one storage device or across multiple storage devices in the logical container 308. The state information for each virtual machine 312, 314 may include information about the state of the processor registers, state of the virtual hardware, state of the virtual memory, and so forth.

As shown in FIG. 3, all of the files and state information related to the virtual machines 312, 314 may be stored in a logical container or storage container 308. It should be appreciated that the logical container 308 may include multiple physical storage repositories 306, 310 that each include multiple physical storage devices such as physical hard drives, partitions, or the like. The logical container 308 may be considered to provide a higher level of organization of the files and state information related to the virtual machines 312, 314. The logical container 308 should be created so that it contains all of the files and state information for those virtual machines that will be migrated.

The use of the logical container 308 makes migrating one and especially multiple virtual machines much simpler. Instead of copying all of the files from the source server 302 to the destination server 304, which was how it was commonly done previously, the administrator need only dismount the logical container 308 from the source server 302 and mount it to the destination server 304. The amount of information that is exchanged between the source server 302 and the destination server 304 is only the amount that is necessary to allow the destination server 304 to successfully connect to the storage container 308.

In one embodiment, the migration of the virtual machines 312, 314 may be controlled by the management service 270 shown in FIG. 2. The management service 270 allows the administrator or other user to quickly and easily migrate the virtual machines 312, 314 in a minimum of steps. For example, the management service 270 may be programmed to receive input from the administrator to migrate the virtual machines from the source server 302 to the destination server 304. The management service 270 act on this input by verifying that the required connections between the servers 302, 304 and the logical container 308 are good and that all of the necessary data to accomplish the migration is in the logical container 308. The management service 270 may then automatically shut down the virtual machines 312, 314, migrate them to the server 304, and start them back up again. This greatly simplifies the process of migrating large numbers of virtual machines between servers.

Figure 4:
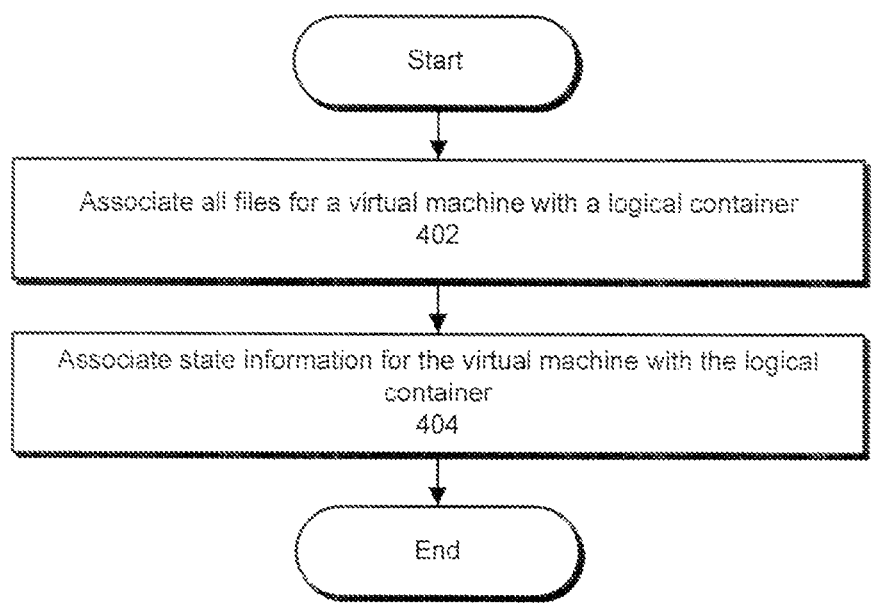
FIG. 4 is a flowchart showing one embodiment of a method to create a logical container that includes all of the files of one or more virtual machines.

The management service 270 may be used to create, destroy, enable, and disable logical containers depending on the number of virtual machines that need to be migrated. In one embodiment, the management service 270 may use the process shown in FIG. 4 to create a logical container. As shown in step 402, all of the files related to the one virtual machine or set of virtual machines that are to be migrated are associated with a logical container. Also, as shown in step 404, the state information for the virtual machine or set of virtual machines is also stored in the logical container. In a live migration (the virtual machines are running when they are migrated), the state information may be stored to the logical container when the virtual machine(s) are paused just prior to being moved. In a cold migration (the virtual machines are shut off when migrated), the state information may be stored in the logical container shortly before the virtual machine(s) are shut down.

Although the management service 270 is shown as controlling migration of the virtual machines, it should be appreciated that in other embodiments, a separate virtual machine control program may be provided to control the virtual machines on the servers 302, 304 as well as control the logical container 308.

Figure 5:
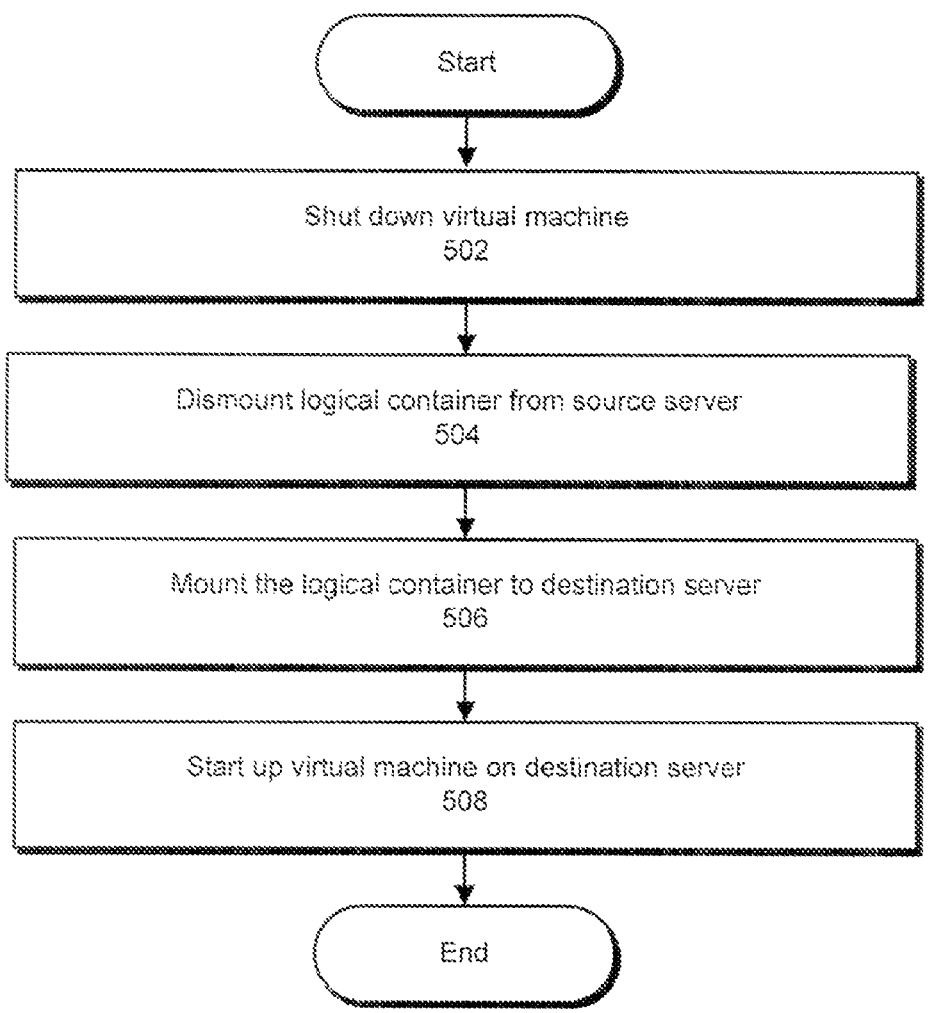
FIG. 5 is a flowchart showing one embodiment of a method to migrate one or more virtual machines from a source host to a destination host by shutting down the virtual machines.

Turning to FIG. 5, one embodiment of a method of cold migrating the virtual machines 312, 314 is shown. The first step 502 is to shut down the virtual machines 312, 314 on the source server 302. After the virtual machines 312, 314 are shut down, the state information is stored in the logical container 308. Once the virtual machines 312, 314 have shut down, the next step 504 is to dismount the logical container 308 from the source server 302. Dismounting the logical container 308 from the source server 302 typically includes relinquishing exclusive access to the logical container 308. Next, the logical container 308 is mounted to the destination server 304 at step 506. Typically this involves establishing exclusive access to the logical container 308 by the destination server 304. In one embodiment, configuration information may be provided to the destination server 304 to allow the destination server 304 to establish a connection to the logical container 308. The configuration information may be provided by the management service 270 or may be copied from the source server 302. Once the logical container 308 has been mounted to the destination server 304, the state information for the virtual machines 312, 314 is retrieved from the logical container 308 and the virtual machines 312, 314 are started up.

Figure 6:
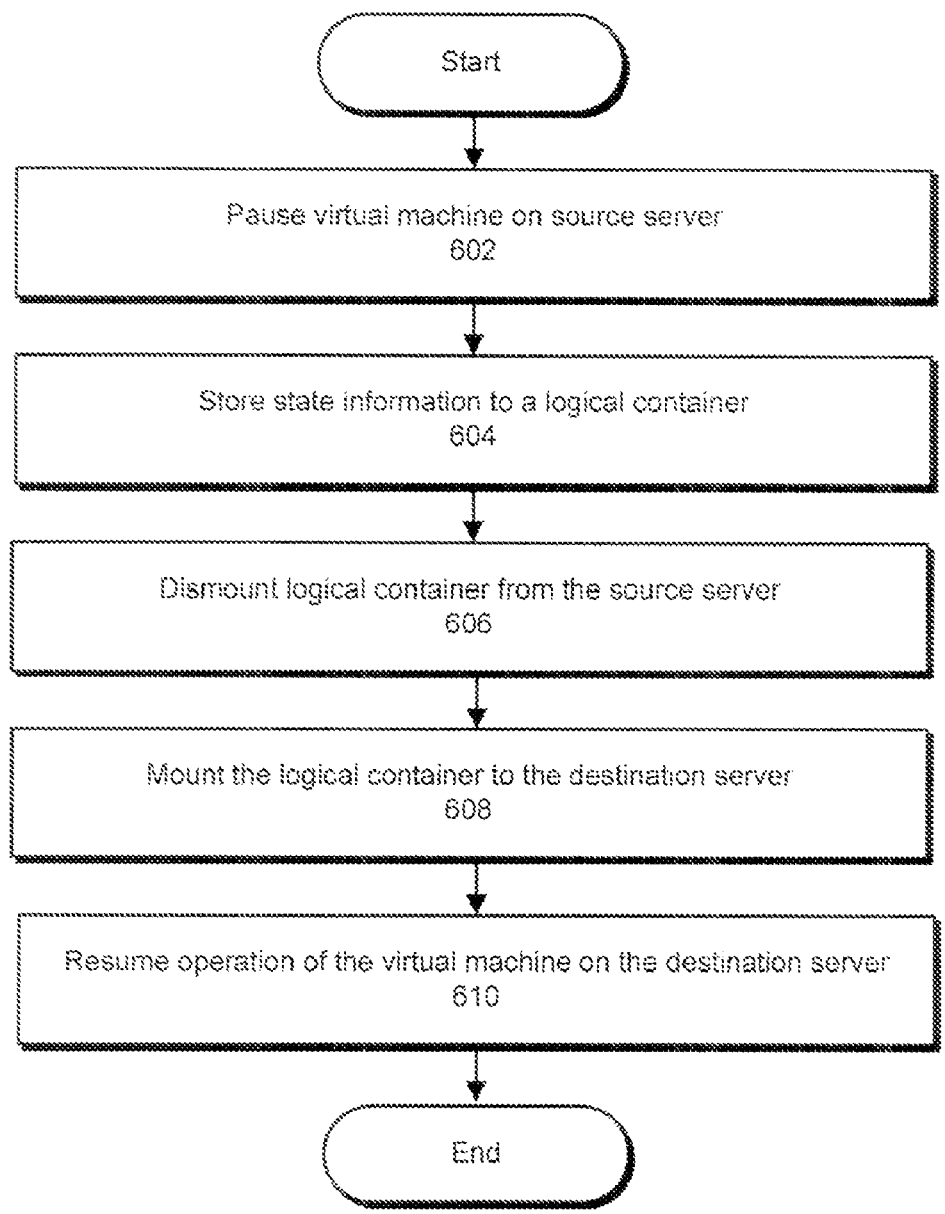
FIG. 6 is a flowchart showing one embodiment of a method to migrate one or more virtual machines from a source host to a destination host while the plurality of virtual machines are running.

FIG. 6 shows one embodiment of a method of hot migrating the virtual machines 312, 314 (i.e., migrating the virtual machines 312, 314 while they are running). The first step 602 is to pause the virtual machines 312, 314 so that the state information remains constant for the duration of the migration. As previously mentioned, this step 602, as well as any of the other steps of this process or any other process described herein may be controlled and/or performed automatically by the management service 270. The next step 604 is to store the state information to the logical container 308. The state information may include information regarding the contents of the memory, etc. The next steps 606, 608 are to dismount the logical container 308 from the source server 302 and mount it to the destination server 304. These steps are carried out in a similar fashion as steps 504, 506 of the cold migration process described above. Now that the logical container 308 is mounted to the destination server 304 and the two components are in communication with each other, the state information is retrieved from the logical container 308. The final step 610 is to resume operation of the virtual machines 312, 314

It should be appreciated that the processes shown in FIGS. 5 and 6 may be used to migrate large numbers of virtual machines quickly and efficiently, especially when a management program such as the management service 270 is used to control the migration. The number of steps necessary to migrate multiple virtual machines is now independent of the number of virtual machines. The number of steps is the same regardless of whether one or twenty virtual machines are migrated. This results in significant saving in time and manpower.

Figure 7:
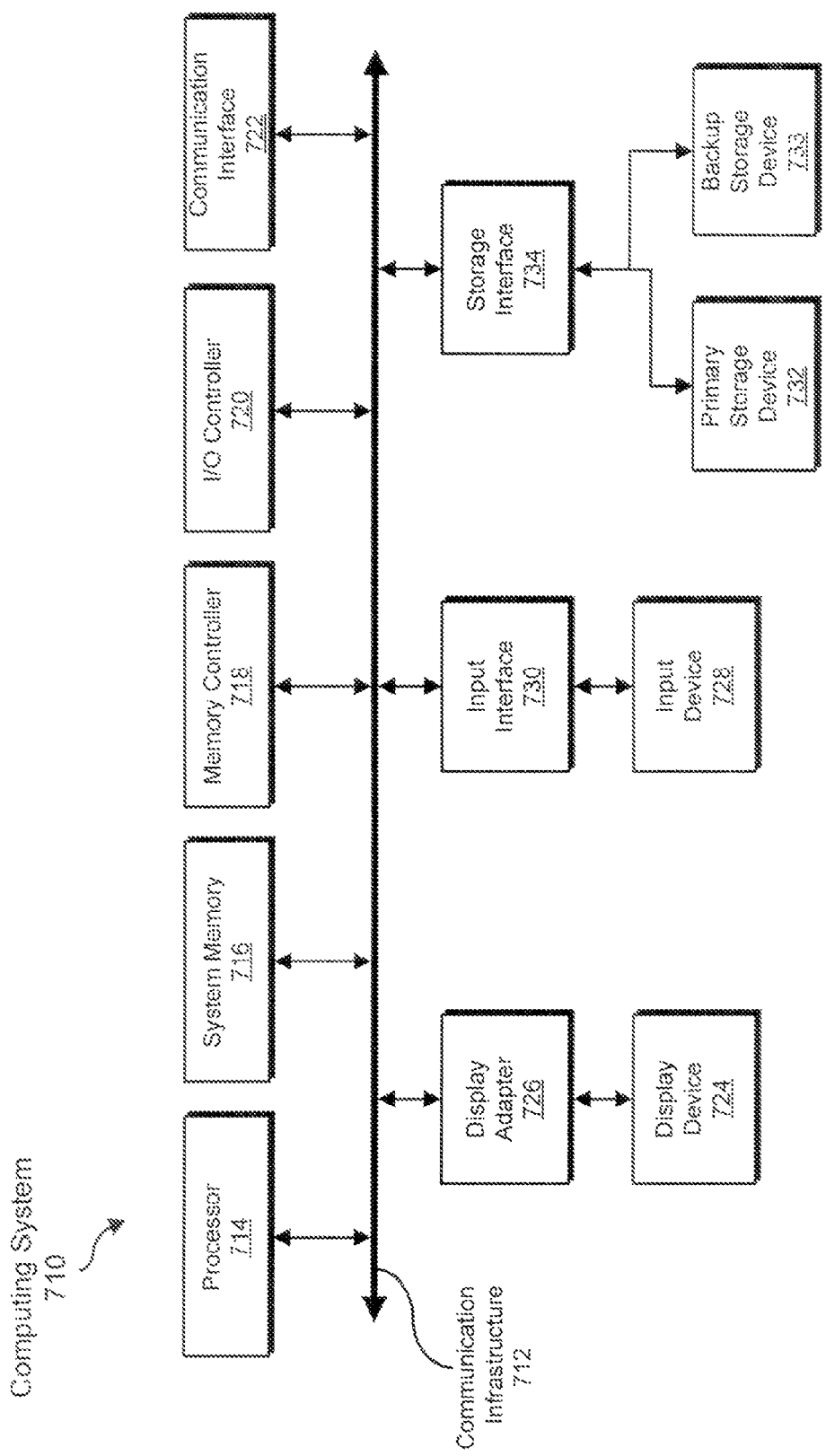
FIG. 7 is a block diagram of an exemplary computing system capable of implementing one or more of the embodiments described and/or illustrated herein.

FIG. 7 is a block diagram of an exemplary computing system 710 capable of implementing one or more of the embodiments described and/or illustrated herein. Computing system 710 broadly represents any single or multi-processor computing device or system capable of executing computer-readable instructions. Examples of computing system 710 include, without limitation, workstations, laptops, client-side terminals, servers, distributed computing systems, handheld devices, or any other computing system or device. In its most basic configuration, computing system 710 may comprise at least one processor 714 and a system memory 716.

Processor 714 generally represents any type or form of processing unit capable of processing data or interpreting and executing instructions. In certain embodiments, processor 714 may receive instructions from a software application or module. These instructions may cause processor 714 to perform the functions of one or more of the exemplary embodiments described and/or illustrated herein. For example, processor 714 may perform and/or be a means for performing, either alone or in combination with other elements, one or more of the associating, migrating, storing, retrieving, mounting, dismounting, locating, restoring, comparing, and retrieving steps described herein. Processor 714 may also perform and/or be a means for performing any other steps, methods, or processes described and/or illustrated herein.

System memory 716 generally represents any type or form of volatile or non-volatile storage device or medium capable of storing data and/or other computer-readable instructions. Examples of system memory 716 include, without limitation, random access memory (RAM), read only memory (ROM), flash memory, or any other suitable memory device. Although not required, in certain embodiments computing device 710 may comprise both a volatile memory unit (such as, for example, system memory 716) and a non-volatile storage device (such as, for example, primary storage device 732, as described in detail below).

In certain embodiments, exemplary computing system 710 may also comprise one or more components or elements in addition to processor 714 and system memory 716. For example, as illustrated in FIG. 7, computing system 710 may comprise a memory controller 718, an Input/Output (I/O) controller 718, and a communication interface 722, each of which may be interconnected via a communication infrastructure 712. Communication infrastructure 712 generally represents any type or form of infrastructure capable of facilitating communication between one or more components of a computing device. Examples of communication infrastructure 712 include, without limitation, a communication bus (such as an ISA, PCI, PCIe, or similar bus) and a network.

Memory controller 718 generally represents any type or form of device capable of handling memory or data or controlling communication between one or more components of computing system 710. For example, in certain embodiments memory controller 718 may control communication between processor 714, system memory 716, and I/O controller 720 via communication infrastructure 712. In certain embodiments, memory controller may perform and/or be a means for performing, either alone or in combination with other elements, one or more of the steps or features described and/or illustrated herein, such as associating, migrating, storing, mounting, dismounting, locating, restoring, comparing, and retrieving.

I/O controller 720 generally represents any type or form of module capable of coordinating and/or controlling the input and output functions of a computing device. For example, in certain embodiments I/O controller may control or facilitate transfer of data between one or more elements of computing system 710, such as processor 714, system memory 716, communication interface 722, display adapter 726, input interface 730, and storage interface 734. I/O controller 720 may be used, for example, to perform and/or be a means for performing, either alone or in combination with other elements, one or more of the identifying, determining, creating, storing, locating, restoring, retrieving, copying, comparing, and retrieving steps described herein. I/O controller 720 may also be used to perform and/or be a means for performing other steps and features set forth in the instant disclosure.

Communication interface 722 broadly represents any type or form of communication device or adapter capable of facilitating communication between exemplary computing system 710 and one or more additional devices. For example, in certain embodiments communication interface 722 may facilitate communication between computing system 710 and a private or public network comprising additional computing systems. Examples of communication interface 722 include, without limitation, a wired network interface (such as a network interface card), a wireless network interface (such as a wireless network interface card), a modem, and any other suitable interface. In at least one embodiment, communication interface 722 may provide a direct connection to a remote server via a direct link to a network, such as the Internet. Communication interface 722 may also indirectly provide such a connection through, for example, a local area network (such as an Ethernet network), a personal area network (such as a BLUETOOTH network), a telephone or cable network, a cellular telephone connection, a satellite data connection, or any other suitable connection.

In certain embodiments, communication interface 722 may also represent a host adapter configured to facilitate communication between computing system 710 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 722 may also allow computing system 710 to engage in distributed or remote computing. For example, communication interface 722 may receive instructions from a remote device or send instructions to a remote device for execution. In certain embodiments, communication interface 722 may perform and/or be a means for performing, either alone or in combination with other elements, one or more of the identifying, determining, creating, storing, locating, restoring, copying, comparing, and retrieving steps disclosed herein. Communication interface 722 may also be used to perform and/or be a means for performing other steps and features set forth in the instant disclosure.

As illustrated in FIG. 7, computing system 710 may also comprise at least one display device 724 coupled to communication infrastructure 712 via a display adapter 726. Display device 724 generally represents any type or form of device capable of visually displaying information forwarded by display adapter 726. Similarly, display adapter 726 generally represents any type or form of device configured to forward graphics, text, and other data from communication infrastructure 712 (or from a frame buffer, as known in the art) for display on display device 724.

As illustrated in FIG. 7, exemplary computing system 710 may also comprise at least one input device 728 coupled to communication infrastructure 712 via an input interface 730. Input device 728 generally represents any type or form of input device capable of providing input, either computer or human generated, to exemplary computing system 710. Examples of input device 728 include, without limitation, a keyboard, a pointing device, a speech recognition device, or any other input device. In at least one embodiment, input device 728 may perform and/or be a means for performing, either alone or in combination with other elements, one or more of the identifying, determining, creating, storing, locating, restoring, copying, comparing, and retrieving steps disclosed herein. Input device 728 may also be used to perform and/or be a means for performing other steps and features set forth in the instant disclosure.

As illustrated in FIG. 7, exemplary computing system 710 may also comprise a primary storage device 732 and a backup storage device 733 coupled to communication infrastructure 712 via a storage interface 738. Storage devices 732 and 733 generally represent any type or form of storage device or medium capable of storing data and/or other computer-readable instructions. For example, storage devices 732 and 733 may be a magnetic disk drive (e.g., a so-called hard drive), a floppy disk drive, a magnetic tape drive, an optical disk drive, a flash drive, or the like. Storage interface 738 generally represents any type or form of interface or device for transferring data between storage devices 732 and 733 and other components of computing system 710.

In certain embodiments, storage devices 732 and 733 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 732 and 733 may also comprise other similar structures or devices for allowing computer software, data, or other computer-readable instructions to be loaded into computing system 710. For example, storage devices 732 and 733 may be configured to read and write software, data, or other computer-readable information. Storage devices 732 and 733 may also be a part of computing system 710 or may be a separate device accessed through other interface systems.

In certain embodiments, the exemplary file systems disclosed herein may be stored on primary storage device 732, while the exemplary file-system backups disclosed herein may be stored on backup storage device 733. Storage devices 732 and 733 may also be used, for example, to perform and/or be a means for performing, either alone or in combination with other elements, one or more of the identifying, determining, creating, storing, locating, restoring, copying, comparing, and retrieving steps disclosed herein. Storage devices 732 and 733 may also be used to perform and/or be a means for performing other steps and features set forth in the instant disclosure.

Many other devices or subsystems may be connected to computing system 710. Conversely, all of the components and devices illustrated in FIG. 7 need not be present to practice the embodiments described and/or illustrated herein. The devices and subsystems referenced above may also be interconnected in different ways from that shown in FIG. 7. Computing system 710 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include recordable media (such as floppy disks and CD- or DVD-ROMs), transmission-type media (such as carrier waves), electronic-storage media, magnetic-storage media, optical-storage media, and other distribution systems.

The computer-readable medium containing the computer program may then be loaded into computing system 710. All or a portion of the computer program stored on the computer-readable medium may then be stored in system memory 716 and/or various portions of storage devices 732 and 733. When executed by processor 714, a computer program loaded into computing system 710 may cause processor 714 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 710 may be configured as an application specific integrated circuit (ASIC) adapted to implement one or more of the exemplary embodiments disclosed herein.

Figure 8:
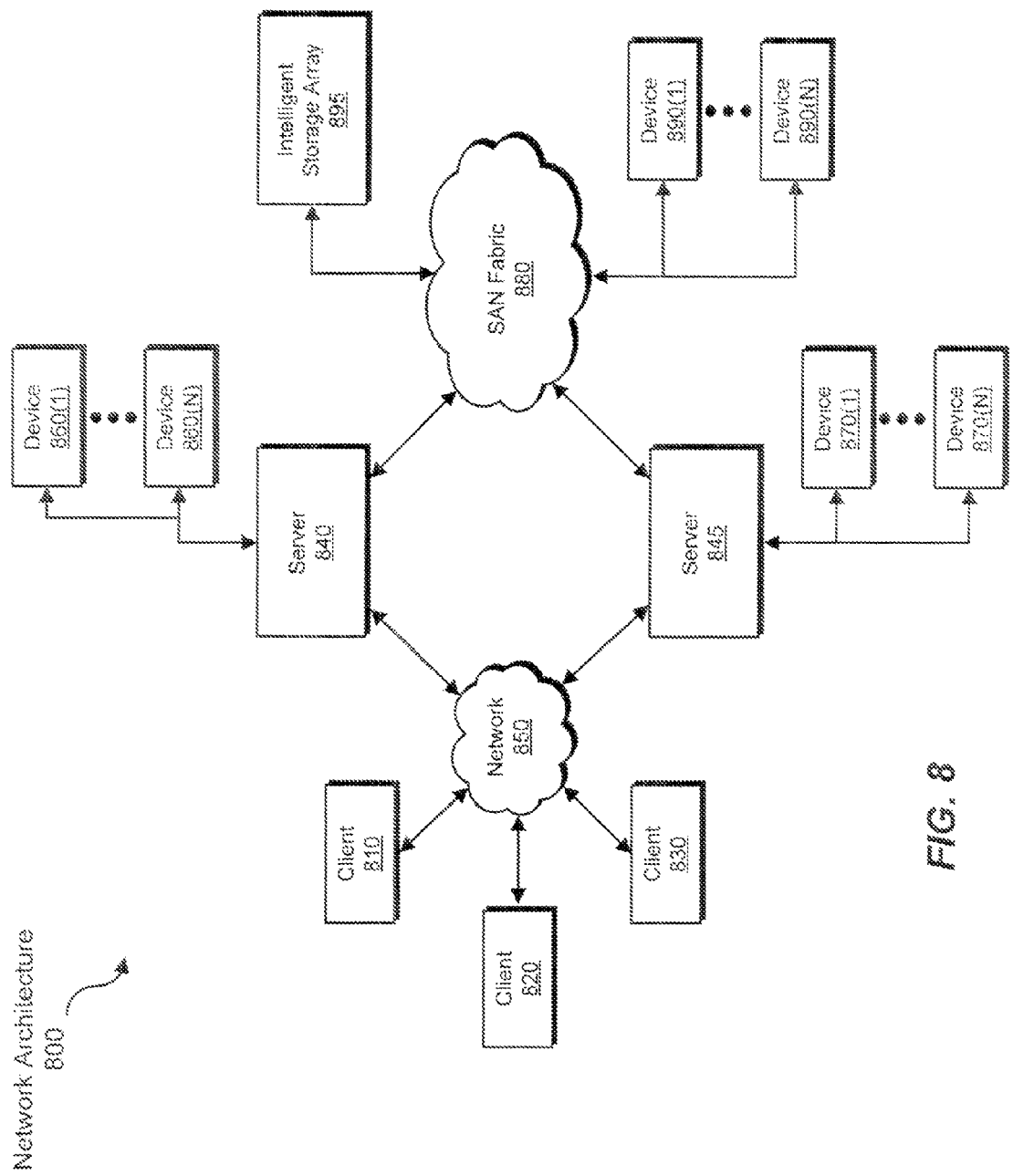
FIG. 8 is a block diagram of an exemplary network architecture in which client systems and servers may be coupled to a network.

FIG. 8 is a block diagram of an exemplary network architecture 800 in which client systems 810, 820, and 830 and servers 840 and 845 may be coupled to a network 850. Client systems 810, 820, and 830 generally represent any type or form of computing device or system, such as exemplary computing system 710 in FIG. 7. Similarly, servers 840 and 845 generally represent computing devices or systems, such as application servers or database servers, configured to provide various database services and/or to run certain software applications. Network 850 generally represents any telecommunication or computer network; including, for example, an intranet, a wide area network (WAN), a local area network (LAN), a personal area network (PAN), or the Internet.

As illustrated in FIG. 8, one or more storage devices 860(1)-(N) may be directly attached to server 840. Similarly, one or more storage devices 890(1)-(N) may be directly attached to server 845. Storage devices 860(1)-(N) and storage devices 890(1)-(N) generally represent any type or form of storage device or medium capable of storing data and/or other computer-readable instructions. In certain embodiments, storage devices 860(1)-(N) and storage devices 890(1)-(N) may represent network-attached storage (NAS) devices configured to communicate with servers 840 and 845 using various protocols, such as NFS, SMB, or CIFS.

Servers 840 and 845 may also be connected to a storage area network (SAN) fabric 880. SAN fabric 880 generally represents any type or form of computer network or architecture capable of facilitating communication between a plurality of storage devices. SAN fabric 880 may facilitate communication between servers 840 and 845 and a plurality of storage devices 890(1)-(N) and/or an intelligent storage array 895. SAN fabric 880 may also facilitate, via network 850 and servers 840 and 850, communication between client systems 810, 820, and 830 and storage devices 890(1)-(N) and/or intelligent storage array 895 in such a manner that devices 890(1)-(N) and array 895 appear as locally attached devices to client systems 810, 820, and 830. As with storage devices 860(1)-(N) and storage devices 870(1)-(N), storage devices 890(1)-(N) and intelligent storage array 895 generally represent any type or form of storage device or medium capable of storing data and/or other computer-readable instructions.

In certain embodiments, and with reference to exemplary computing system 710 of FIG. 7, a communication interface, such as communication interface 722 in FIG. 7, may be used to provide connectivity between each client system 810, 820, and 830 and network 850. Client systems 810, 820, and 830 may be able to access information on server 840 or 845 using, for example, a web browser or other client software. Such software may allow client systems 810, 820, and 830 to access data hosted by server 840, server 845, storage devices 860(1)-(N), storage devices 870(1)-(N), storage devices 890(1)-(N), or intelligent storage array 895. Although FIG. 8 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 840, server 845, storage devices 860(1)-(N), storage devices 870(1)-(N), storage devices 890(1)-(N), intelligent storage array 895, or any combination thereof. All or a portion of one or more of the exemplary embodiments disclosed herein may also be encoded as a computer program, stored in server 840, run by server 845, and distributed to client systems 810, 820, and 830 over network 850. Accordingly, network architecture 800 may perform and/or be a means for performing, either alone or in combination with other elements, one or more of the identifying, determining, creating, storing, locating, restoring, copying, comparing, and retrieving steps disclosed herein. Network architecture 800 may also be used to perform and/or be a means for performing other steps and features set forth in the instant disclosure.

For example, in certain embodiments the exemplary file systems disclosed herein may be stored on client systems 810, 820, and/or 830. Similarly, the exemplary file-system backups disclosed herein may be stored on server 840, server 845, storage devices 860(1)-(N), storage devices 870(1)-(N), storage devices 890(1)-(N), intelligent storage array 895, or any combination thereof.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A method of batch migrating a plurality of virtual machines from a source server to a destination server, the method comprising:

creating a single logical container, wherein creating the single logical container is dependent on how many virtual machines are in the plurality of virtual machines;
associating files from the plurality of virtual machines with a single logical container;
storing state information of each virtual machine in the plurality of virtual machines in the single logical container, such that the state information for the plurality of virtual machines and the files from the plurality of virtual machines are all stored in the single logical container;
wherein the single logical container provides a higher level of organization of virtual machine files and of the state information for the plurality of virtual machines;
migrating each virtual machine in the plurality of virtual machines together from the source server to the destination server by:
shutting down the plurality of virtual machines;
after shutting down the plurality of virtual machines, dismounting the single logical container from the source server;
mounting the single logical container on the destination server;
after mounting the single logical container on the destination server, starting up the plurality of virtual machines.

2. The method of claim 1, wherein a management service controls batch migration of the plurality of virtual machines by:
receiving input requesting migration of the plurality of virtual machines from the source server to the destination server;
creating the single logical container;
after creating the single logical container, performing the associating step in a single operation;
performing the shutting down of the plurality of virtual machines in a single operation;
performing the storing of the state information in the single logical container in a single operation after shutting down the plurality of virtual machines and before mounting the single logical container on the destination server;
providing configuration information to the destination server to enable the destination server to establish a connection with the single logical container;
performing the starting up of the plurality of virtual machines in a single operation.

3. The method of claim 1 wherein:
the files from the plurality of virtual machines comprise, for each virtual machine, a related set of files that include one or more configuration files, one or more virtual disk files, and/or one or more virtual storage files;
for each virtual machine, the related set of files are stored in the single logical container as a single file.

4. The method of claim 2 wherein:
the plurality of virtual machines are managed by a hypervisor and operate at a virtualization level above the hypervisor;
the management service comprises a clustering application and operates at the virtualization level above the hypervisor.

5. The method of claim 1 wherein the plurality of virtual machines comprises at least one hundred virtual machines.

6. The method of claim 1 wherein:
dismounting the single logical container from the source server includes relinquishing exclusive access to the single logical container by the source server and mounting the single logical container to the destination server includes acquiring exclusive access to the single logical container;

an amount of information exchanged between the source server and the destination server for migrating all of the virtual machines in the plurality of virtual machines is limited to only information needed to enable the destination server to successfully connect to the single logical container.

7. The method of claim 1 wherein the logical container comprises a plurality of storage repositories, each storage repository in the plurality of storage repositories comprising a storage area network.

8. A method of batch migrating a plurality of virtual machines, the method comprising:

pausing the plurality of virtual machines that are operating on a source server so that the virtual machines are in a stable state;

creating a single logical container, wherein creating the single logical container is dependent on how many virtual machines are in the plurality of virtual machines;

storing state information for each virtual machine in the plurality of virtual machines to the single logical container, the single logical container including one or more files from each virtual machine in the plurality of virtual machines;

wherein the single logical container provides a higher level of organization of virtual machine files and of the state information for the plurality of virtual machines;

dismounting the single logical container from the source server;

mounting the single logical container to a destination server; and resuming operation of each virtual machine in the plurality of virtual machines on the destination server;

wherein the plurality of virtual machines are simultaneously migrated from the source server to the destination server while each virtual machine in the plurality of virtual machines is running on the source server.

9. The method of claim 8 wherein a management service manages batch migration of the plurality of virtual machines such that all virtual machines in the plurality of virtual machines are simultaneously migrated from the source server to the destination server in a number of steps limited to a minimum number of steps that would be needed to migrate a single virtual machine from the source server to the destination server.

10. The method of claim 9 wherein:

pausing the plurality of virtual machines, storing the state information for each virtual machine in the plurality of virtual machines, and/or resuming operation of each virtual machine in the plurality of virtual machines is accomplished in a single operation using the management service;

the management service stores the state information for each virtual machine in the single logical container after the plurality of virtual machines are paused and before the single logical container is dismounted from the source server.

11. The method of claim 10 wherein the management service further manages batch migration of the plurality of virtual machines by:

receiving input requesting migration of the plurality of virtual machines from the source server to the destination server;

creating, based on how many virtual machines are in the plurality of virtual machines, the single logical container such that it contains all files of each virtual machine in the plurality of virtual machines.

12. The method of claim 11 wherein the management service is programmed to create, destroy, enable, and disable the single logical container.

13. The method of claim 12 wherein the management service is programmed to, before dismounting the single logical container, verify that all data needed to migrate the plurality of virtual machines from the source server to the destination server are stored in the single logical container.

* * * * *

UNITED STATES PATENT AND TRADEMARK OFFICE
CERTIFICATE OF CORRECTION

| | | |
|---|---|---|
| PATENT NO. | : 8,191,063 B2 | Page 1 of 1 |
| APPLICATION NO. | : 11/865063 | |
| DATED | : May 29, 2012 | |
| INVENTOR(S) | : Randall Shingai and Suhas Urkude | |

It is certified that error appears in the above-identified patent and that said Letters Patent is hereby corrected as shown below:

On the Title Page:

Item (73) The Assignee should read--

Symantec Corporation, Mountain View, CA (US)

Signed and Sealed this
Fourth Day of September, 2012

David J. Kappos
*Director of the United States Patent and Trademark Office*